United States Patent

[11] 3,610,795

| [72] | Inventor | Jacques Antoine<br>Metz, France |
|---|---|---|
| [21] | Appl. No. | 866,308 |
| [22] | Filed | Oct. 14, 1969 |
| [45] | Patented | Oct. 5, 1971 |
| [73] | Assignee | Intitut de Recherches de la siderurgie Francaise<br>Saint Germain-en-Laye (Yvelines), France |
| [32] | Priority | Oct. 17, 1968 |
| [33] | | France |
| [31] | | 170,197 |

[54] APPARATUS FOR CONTINUOUSLY MELTING OF METAL
8 Claims, 2 Drawing Figs.

[52] U.S. Cl. .................................................. 13/9, 13/33, 13/34
[51] Int. Cl. ..................................................... F27d 3/14, F27d 11/10
[50] Field of Search............................................ 13/9, 12, 33, 34

[56] References Cited
UNITED STATES PATENTS

| 848,422 | 3/1907 | Wynne.......................... | 13/33 UX |
| 1,339,428 | 5/1920 | Trembour ..................... | 13/34 |

*Primary Examiner*—Bernard A. Gilheany
*Assistant Examiner*—R. N. Envall, Jr.
*Attorney*—Michael S. Striker

ABSTRACT: Apparatus for continuously melting of metal including a first electric arc furnace into which the solid metal is continuously fed to be molten therein by electric arcs produced by a plurality of electrodes extending into the first furnace, and a second furnace connected by a passage to the first furnace so that molten metal may flow through the passage from the first into the second furnace. Provisions are made to prevent solidifying of the metal, heated in the first furnace to the temperature of the liquidus, in the passage.

PATENTED OCT 5 1971

3,610,795

INVENTOR:
JACQUES ANTOINE

APPARATUS FOR CONTINUOUSLY MELTING OF METAL

BACKGROUND OF THE INVENTION

The present invention relates to improvements of electric arc furnaces used for the continuous melting of metals.

In order to continuously treat a metal, especially steel, in an electric arc furnace, it is preferred, in order to reduce the consumption of electricity and also to reduce the wear of the refractory lining of the furnace, to proceed in two phases, each of which is carried out in a separate furnace. In a first furnace the metal is molten to a temperature which is maintained as close as possible to the temperature of the liquidus and then the molten metal is continuously transferred through a passage of refractory material into a second furnace in which the metal is reheated and its composition adjusted by addition of appropriate material thereto.

Such a process requires the continuous flow of liquid metal through a passage of refractory material to assure a continuous transfer of the metal from the melting furnace into the refining furnace. However, since the temperature of the metal in the melting furnace is relatively low, it will be understood that under these thermal conditions the metal has the tendency to solidify and to block the passage which assures the communication between the two furnaces.

SUMMARY OF THE INVENTION

It is an object of the present invention to overcome the above disadvantages of such furnace arrangements known in the prior art.

It is a further object of the present invention to provide for an apparatus of the aforementioned type in which solidifying of metal in the passage connecting the melting furnace with the refining furnace is positively prevented.

With these objects in view, the apparatus of the present invention for the continuous melting of metal mainly comprises a first electric arc furnace including a plurality of electrodes extending substantially in vertical direction into this furnace and means for supplying electrical energy to the electrodes, the electrodes and the means for supplying electrical energy thereto are arranged and constructed in such a manner that one of the electrodes receives a greater amount of electrical energy than either of the other electrodes. A second furnace is arranged adjacent to the first furnace and passage means connect the first to the second furnace for the flow of molten metal from the first into the second furnace. The passage means communicates with the first furnace in the region of a wall portion of the latter adjacent to the one electrode so that this wall portion is heated to a higher temperature than the remainder of the wall of the first furnace due to the increased heat radiation emitted by the one electrode which receives a greater amount of electrical energy than the other electrodes.

The apparatus of the present invention may also have the following characteristics in combination with the characteristics mentioned above.

1. The passage means which connects the two furnaces may at least in part be formed from refractory material which has a higher heat conductivity than that of the refractory material forming the lining of the first furnace.

2. The refractory material forming the passage means may be insulated from the refractory material of the lining of the first furnace and from the outer atmosphere by refractory material of poor heat conductivity.

3. The open cross section of the aforementioned passage may be limited in upward direction by a substantially vertical wall having a lower end portion adapted to extend into the molten metal flowing from the first into the second furnace, and this wall may be formed from refractory material which has a heat conductivity greater than the refractory material which forms the lining of the first furnace.

4. The means supplying the electrodes of the first furnace with electrical energy may be provided with means to unbalance the phases of the electrical supply means to thus increase the electrical energy supplied to the one electrode which is arranged nearest to the inlet opening of the passage between the two furnaces.

Basically, the present invention provides means to reduce the danger of solidifying of metal in the passage of refractory material which connects the two furnaces, by using the heat radiation emitted by the electrode to which a greater amount of electrical energy is supplied than to the remainder of the electrodes so as to elevate the temperature of the metal in the neighborhood of the inlet opening of the passage and to heat the latter.

To this effect the present invention utilizes a phenomenon, considered usually detrimental, which takes place in all electric arc furnaces equipped with three electrodes and supplied from a three phase network. As well known, the electrical energy supplied to the three electrodes of an electric arc furnace is, due to mutual induction, not equal. Even if, according to the usually used technique, the electrodes are arranged in the corners of a triangle, the extreme electrodes will respectively receive electrical energy superior or inferior to the average electrical energy. The electrode which dissipates the most energy is called the "hot phase" and the other electrodes "dead phase." This phenomenon is usually considered detrimental since it involves a rapid deterioration of the refractory lining of the furnace by provoking formation of hot points in the proximity of the hot phase. Various solutions have been proposed to overcome this unbalancing of the phases.

In the furnace according to the present invention this natural asymmetry is increased, by appropriate regulating means or by an appropriate arrangement of the supply circuit to the electrodes, in order to increase the electrical energy dissipated by the hot phase and in consequence the intensity of the heat radiation directed toward the inlet opening of the passage through which metal flows from the melting furnace into the refining furnace. The heat radiation emitted by the hot phase reaches, on the one hand, the surface of the metal if the latter is not covered by slag and, on the other hand, the refractory material forming the evacuation passage and the wall of the furnace adjacent to this passage. In this way, the metal in the zone of radiation of the hot phase located in the neighborhood of the inlet opening of the passage is heated to a higher degree and a proper heating of the evacuation passage is obtained, which results in a reduction of thermic loss of the metal during the flow thereof through the evacuation passage, which in turn reduces the risk of obstructing this passage by metal solidifying therein.

It is to be understood that, if the metal is covered by slag, it cannot be directly heated by the heat rays emitted by the hot phase. However, in this case, the furnace is always equipped, in the region of the evacuation orifice, with a vertical wall of refractory material, which may be fixed or movable, and arranged to maintain the slag in the melting furnace and having a lower portion in contact with the metal contained in the melting furnace. This wall of refractory material is likewise situated in the zone of radiation of the hot phase and therefore is maintained at a temperature superior to that of the metal, which is in the neighborhood of the temperature of the liquidus. Therefore, calories will be transferred from the refractory partition into the stream of metal and the latter is therefore heated.

In both cases, that is when the metal is not covered with slag or when the metal is covered by slag, a substantial elevation of the temperature of the metal passing through the aforementioned passage is obtained, which in turn eliminates the risk of obstruction of this passage.

It is also possible to increase the efficiency of transfer of calories between the metal and the refractory material by constructing the passage, the wall of the furnace adjacent to the inlet opening of the passage and the vertical partition from refractory material having a high heat conductivity. In this case it is necessary to isolate these elements from the outer atmosphere and the rest of the lining of the melting furnace by means of refractory material having a low heat conductivity. It is further possible, in order to increase the heating of the refractory material, to purposely increase the unbalance of the supply phases in order to increase the energy dissipated by the hot phase. This result may be obtained by appropriately regulating the energy supplied to the phases or by modifying the secondary windings of the transformer to thus create an unbalance at the low tension side of the transformer and to increase in this way the unbalance of the energy supplied to the three electrodes. It is likewise possible to modify the impedance of the central phase for instance by shortening the length of the low tension cable of this phase or by using additional induction coils in the circuits of the other phases.

It is to be understood that the invention may be used in all kinds of electric arc furnaces for melting of metal, but that it is of particular interest in a furnace in which the temperature of the molten metal is maintained in the neighborhood of the temperature of the liquidus of the metal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 2:
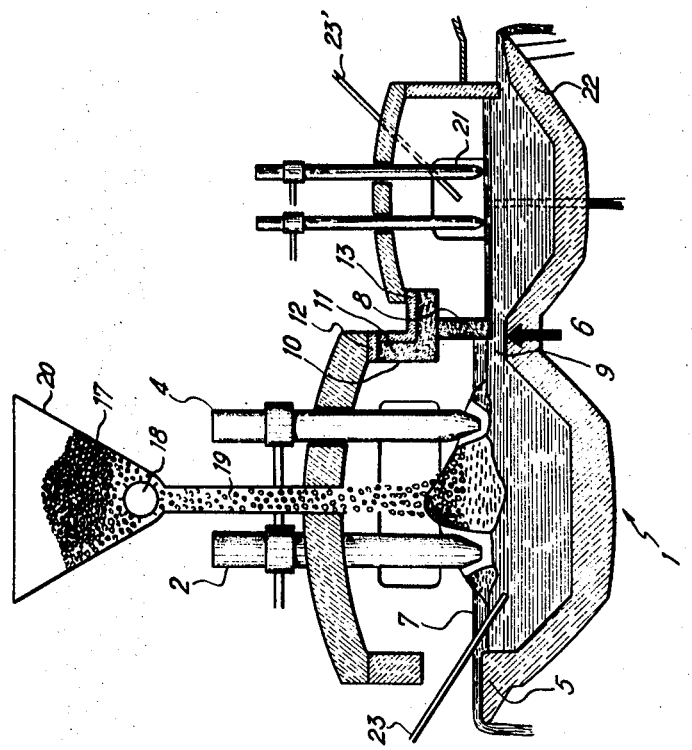
FIG. 2 is a vertical cross section through a complete apparatus according to the present invention and comprising two arc furnaces connected to each other by a passage for the flow of molten metal from one into the other furnace.

In the following description identical elements are designated with the same reference numerals.

Figure 1:
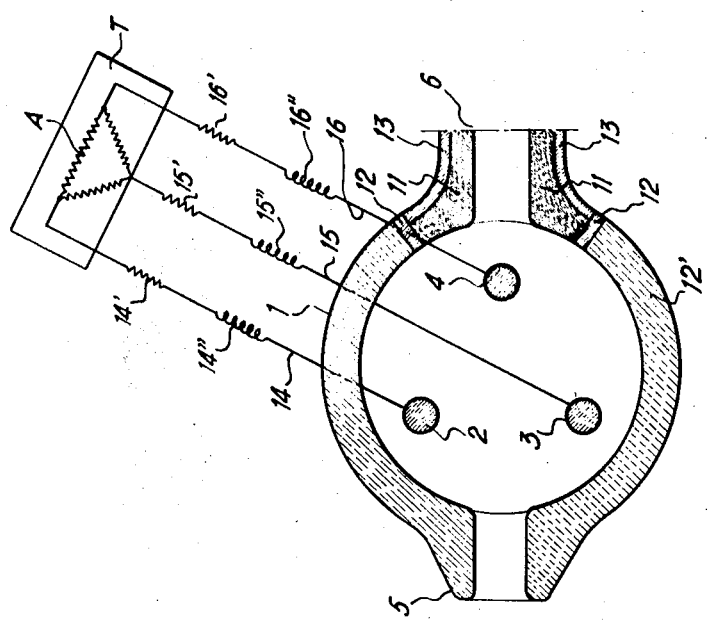
FIG. 1 is a horizontal cross section through an arc furnace according to the present invention and showing the arrangement of the discharge conduit for the metal and the arrangement of the electrodes.

FIG. 1 illustrates an electric arc furnace which comprises a vessel 1 in the interior of which three vertical electrodes 2, 3 and 4 are arranged. The vessel 1 is provided with a slag outlet 5 and a passage or conduit 6 through which metal, molten in the melting furnace illustrated in FIG. 1, may flow out from the latter into a refining furnace which is not illustrated in FIG. 1, but which is shown in FIG. 2. As explained above the three supply phases of the electrodes are not in equilibrium and one of the electrodes, the so-called hot phase, receives a greater amount of electric energy than the two other electrodes. In FIG. 1, the electrode forming the hot phase is designated with the reference numeral 4. The conduit or passage 6 is therefore arranged with regard to the electrode 4 in a zone in which the heat radiation of the aforementioned hot phase is most intense. Due to this arrangement, the wall portion of the furnace located in the zone of radiation of the hot zone, as well as the refractory material of the conduit 6 is heated to a temperature which is higher than the rest of the furnace. Therefore, the metal in contact with this part of the structure and which passes through the conduit 6 is heated to a temperature superior to the temperature of the metal produced in the melting furnace, since the latter is always maintained at a temperature in the neighborhood of the temperature of the liquidus of the metal, due to the continuous presence of solid metal fed into the furnace. The risk of obstructing the passage 6 by metal solidifying therein is, as can be easily conceived, thereby eliminated, since the metal passing through the passage 6 is maintained at a temperature considerably higher than the fusion temperature maintained in the vessel 1.

When as usual, slag 7 is produced in the melting furnace, the opening in the passage 6 is preferably limited in upward direction by a partition 8 of refractory material which is disposed to maintain the slag in the melting furnace, and the lower portion of which is in contact with the metal 9. FIG. 2 clearly shows that, despite the presence of a layer of slag, the metal is reheated by the hot phase due to the position of the passage 6 with regard to the latter. Due to this positioning of the hot phase, the heat rays emitted by the same will reach the wall portion 10 of the melting furnace and the partition 8 so as to raise the temperature of the same. Since the lower end of the partition 8 extends in the metal 9, the temperature of which is in the neighborhood of the liquidus and therefore inferior to that of the partition 8, calories received by the partition will pass into the flowing metal so as to heat the latter by contact with the partition. This will assure that the metal flowing through the passage 6 is maintained at a temperature considerably higher than the temperature of the liquidus and the risk that the metal will solidify in the passage 6 is therefore completely avoided.

FIGS. 1 and 2 show also a construction in which refractory material of high thermal conductivity is used to increase the transfer of calories to the metal. Preferably the thermal losses of the refractory material of high thermal conductivity toward the outside of the furnace and the transfer of calories toward the remainder of the walls of the furnace are reduced by the construction shown. In order to obtain this result, insulating refractory material 12 of low thermal conductivity is, as shown in FIG. 1, interposed between the elements 11 of refractory material of high heat conductivity, and the remainder of the wall 12' of the furnace of refractory material of low heat conductivity, and an outer layer 13, likewise of refractory material of low heat conductivity, limits the heat radiation toward the exterior.

FIg. 2 shows in vertical section, the position of the aforementioned elements in a construction in which a vertical partition 8 is located in the passage 6. This partition is likewise made of refractory material of high conductivity and, as can be seen from FIG. 2, the calories received by the refractory material of high conductivity cannot pass into the refractory material from which the remainder of the melting furnace is formed, since they are stopped by the thermal barriers constituted by the joints 12. Likewise, heat radiation toward the exterior is limited by means of an insulating cover 13.

The only heat exchange possible is therefore into the metal and this heat exchange will take place with an increased intensity due to the good heat conductivity of the refractory material in contact with the metal.

This construction is of special advantage since it permits to elevate the temperature of the metal to a considerable degree.

This construction has the decisive advantage to eliminate the risk of blocking the passage of refractory material for the transfer of liquid metal from the melting furnace into the refining furnace. The disastrous consequence of such blocking can be easily realized, since it would require stopping of the operation of the furnace, emptying the furnace and subsequently thereto the demolition and rebuilding of the passage between the two furnaces.

An additional very important advantage of the present invention is the improvement derived by placing the inlet opening of the passage between the two furnaces at the location at which in continuously used arc furnaces according to the prior art an increased wear of the lining of the furnaces takes place. In such furnaces according to the prior art, which do not have such an arrangement of the passage, the refractory material of the furnace wall adjacent the hot phase is overheated, which results in an increased wear of the furnace lining. Contrary thereto, in the furnace according to the present invention, the flow of metal of relatively low temperature, which is heated up by contact with the refractory material, constantly withdraws calories from the lining and thereby reduces the temperature of the latter, which in turn reduces the wear of the lining considerably. This result is of great importance since it increases the productivity of the arrangement, due to the increase in time it may remain in operation between the necessary reconstruction of its lining.

FIG. 1 schematically indicates also an arrangement for producing an unbalance in the supply of the three electrodes with electrical energy in such a manner that a hot phase is produced in the electrode 4 adjacent to the passage 6. As shown in FIG. 1, three conductors or bars 14, 15 and 16 connect respectively the electrodes 2, 3 and 4 with the three apices of the triangle A of transformer T. It is apparent that the bar 15 is "internal" with respect to the two other bars and is subjected to mutual induction from the two external bars 14 and 16. Consequently, the electrical energy in electrode 3 has an average value. When the direction of the current is set properly in order to govern the sequence of the phases (this step of usual practice may be effected by any operator) the electrode 4 located near the passage 6 will dissipate the highest electrical energy and will be the "hot phase" while the electrode 2, at the other end, will be the "dead phase" in that example.

Each conductor or bar comprises a resistance respectively 14', 15' and 16' and an induction coil respectively 14" 15", 16". It is also possible to increase the lack of balance of the phases by causing the impedance in bars 14 and 15 to vary, and thus adjusting the electrical energy dissipated by electrode 4. In that way, the heat produced near the passage 6 is increased or decreased.

As shown in FIG. 2, the melting furnace 1 is supplied with metal pellets 16 from a hopper 20 and feedscrew 18 located therein which continuously feeds the pellets 16 through the feed tube 19 into the melting furnace. The slag 7 forming therein is discharged through the slag discharge spout 5, and the molten metal 9 forming in the bottom portion of the melting furnace flows through the passage 6 into the refining furnace adjacent the right side thereof and is discharged from the latter through the metal discharge spout 22. Any slag forming in the refining furnace may be discharged through the discharge opening 21 formed therein. Lances 23 and 23' respectively serve to feed additional material into the melting furnace and in the refining furnace. The latter is provided with three additional electrodes, only two of which are shown in FIG. 2 to heat the metal therein to the appropriate discharge temperature.

It will be understood that each of the elements described above, or two or more together, may also find a useful application in other types of apparatus for continuous melting of solid metal differing from the types described above.

While the invention has been illustrated and described as embodied in apparatus for the continuous melting of solid metal in which a melting furnace is connected by a passage to a refining furnace and in which provisions are made to prevent solidifying of the molten metal in this passage, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. Apparatus for the continuous melting of solid metal, comprising a first electric arc furnace including a plurality of electrodes extending in substantially vertical direction into the furnace and means for supplying electrical energy to said electrode, said electrodes and said means for supplying electrical energy thereto being arranged and constructed that one of the electrodes receives a greater amount of electrical energy than either of the other electrodes; a second arc furnace adjacent to the first arc furnace; means for continuously feeding solid metal to be melted into the first furnace; and passage means connecting said first with said second furnace for the flow of metal melted in said first furnace into said second furnace, said passage means communicating with said first furnace in the region of a wall portion of the latter adjacent to said one electrode which receives a greater amount of electrical energy and therefore has a greater heat radiation than the other electrodes so that the wall portion adjacent to the one electrode is heated to a higher temperature than the remainder of the wall of the first furnace.

2. An apparatus as defined in claim 1, wherein said first furnace is lined with refractory material, and wherein said passage means is at least in part formed from refractory material having a higher heat conductivity than that of the lining.

3. An apparatus as defined in claim 2, wherein said refractory material of said passage means is insulated from the refractory material of the lining and from the outer atmosphere by refractory material of low-heat conductivity.

4. An apparatus as defined in claim 1, wherein the opening of said passage is limited in an upward direction by a substantially vertical wall, the lower end portion of which is adapted to extend into the molten material flowing from the first into the second furnace, said vertical wall being formed from refractory material having a heat conductivity greater than the refractory material forming the lining of the first furnace.

5. An apparatus as defined in claim 1, and including means in said means for supplying electrical energy to said electrodes to unbalance the phases of the means for supplying electrical energy to said electrodes for thus increasing the electrical energy supplied to said one electrode as compared to that supplied to the other electrodes.

6. An apparatus as defined in claim 1 and including means for increasing the lack of electrical balance of the arrangement.

7. A method for continuously melting of metal in an electric arc furnace into which a plurality of electrodes extend, said method comprising the steps of arranging the electrodes in the furnace and supplying electrical energy to the electrodes in such a manner that one of the electrodes receives a greater amount of electrical energy than each of the other electrodes; continuously feeding metal to be melted in said furnace; continuously melting the metal by the arcs produced between the electrodes and the metal; and discharging the molten metal from the furnace at a point closely adjacent to said one electrode.

8. A method as defined in claim 7, wherein said electrodes are supplied by conductors with electrical energy and including the step of varying the impedance of the conductors in such a manner so as to increase the lack of balance in the system supplying the electrodes with electrical energy and the electrical energy supplied to said one electrode and therewith the heat radiation emitted therefrom.